(12) United States Patent
Siddalinga et al.

(10) Patent No.: US 11,284,330 B2
(45) Date of Patent: Mar. 22, 2022

(54) SYSTEMS, METHODS, AND APPARATUSES FOR DEVICE ROUTING MANAGEMENT

(71) Applicant: COMCAST CABLE COMMUNICATIONS, LLC, Philadelphia, PA (US)

(72) Inventors: Prasad Ramanahally Siddalinga, Wayne, PA (US); Sanjay Kumar Sharma, Downingtown, PA (US); Billy Stephens, West Chester, PA (US)

(73) Assignee: COMCAST CABLE COMMUNICATIONS, LLC, Philadelphia, PA (US)

( * ) Notice: Subject to any disclaimer, the term of this patent is extended or adjusted under 35 U.S.C. 154(b) by 0 days.

(21) Appl. No.: 16/889,351

(22) Filed: Jun. 1, 2020

(65) Prior Publication Data

US 2020/0404572 A1 Dec. 24, 2020

Related U.S. Application Data

(60) Provisional application No. 62/865,754, filed on Jun. 24, 2019.

(51) Int. Cl.
*H04W 40/24* (2009.01)
*H04L 29/12* (2006.01)
*H04L 61/10* (2022.01)
*H04L 101/622* (2022.01)
*H04W 88/16* (2009.01)
*H04W 84/12* (2009.01)

(52) U.S. Cl.
CPC .......... *H04W 40/248* (2013.01); *H04L 61/10* (2013.01); *H04L 61/6022* (2013.01); *H04W 84/12* (2013.01); *H04W 88/16* (2013.01)

(58) Field of Classification Search
None
See application file for complete search history.

(56) References Cited

U.S. PATENT DOCUMENTS

| 6,986,157 B1 * | 1/2006 | Fijolek ................... H04L 12/18 370/395.2 |
| 7,072,323 B2 | 7/2006 | Roberts et al. |
| 7,660,287 B2 * | 2/2010 | Axelsson .............. H04W 40/24 370/338 |
| 8,700,800 B2 | 4/2014 | Gupta et al. |
| 9,843,520 B1 * | 12/2017 | Haltore ................ H04L 47/125 |

(Continued)

FOREIGN PATENT DOCUMENTS

EP 2521320 B1 6/2015

*Primary Examiner* — Kenny S Lin
(74) *Attorney, Agent, or Firm* — Ballard Spahr LLP

(57) ABSTRACT

Methods, systems, and apparatuses for device routing management are disclosed. A client device of a wireless network may roam from a first access point to a second access point of the wireless network. The second access point, or the client device itself, may send a network message indicating the client device is currently being served by the second access point. The message may cause a network mapping stored at the first access point and/or at each device associated with the wireless network to be updated to indicate the client device is associated with the second access point, thereby enabling proper routing of network traffic to the client device via the second access point.

20 Claims, 7 Drawing Sheets

(56) References Cited

U.S. PATENT DOCUMENTS

| | | | |
|---|---|---|---|
| 2006/0288411 A1* | 12/2006 | Garg | H04L 63/0254 726/22 |
| 2009/0003252 A1* | 1/2009 | Salomone | H04W 40/244 370/311 |
| 2009/0201916 A1* | 8/2009 | Caron | H04L 12/66 370/352 |
| 2016/0100369 A1* | 4/2016 | Chhabra | H04W 52/0229 370/311 |
| 2018/0124693 A1* | 5/2018 | Ringland | H04W 48/18 |
| 2019/0253380 A1* | 8/2019 | Bennett | H04L 61/1552 |

* cited by examiner

Device Address:    10.0.0.01
Hardware Address: 00:AD:45:BH:11:00

FIG. 2A

Destination: FF:FF:FF:FF:FF:FF
Source: 00:DF:45:DF:33:11
Sender MAC Address: 00:DF:45:DF:33:11
Sender IP Address: 10.0.0.01
Target MAC Address: FF:FF:FF:FF:FF:FF
Target IP Address: 10.0.0.01

FIG. 2B

Device Address:    10.0.0.01
Hardware Address: 00:DF:45:DF:33:11

FIG. 2C

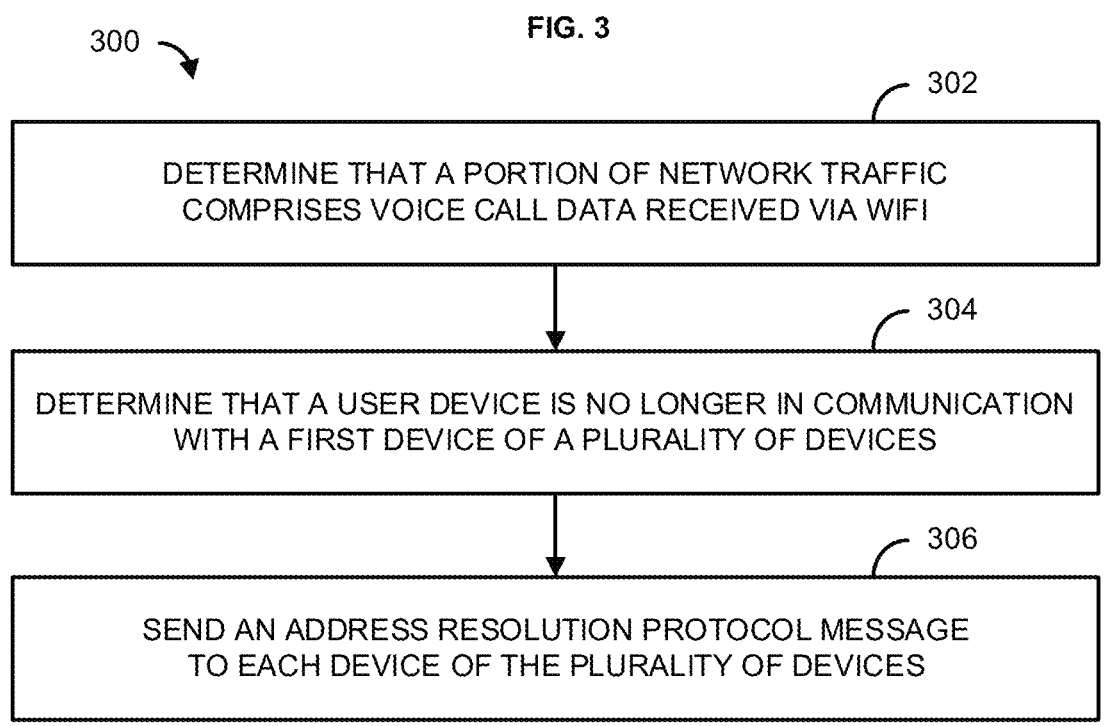

SYSTEMS, METHODS, AND APPARATUSES FOR DEVICE ROUTING MANAGEMENT

CROSS-REFERENCE TO RELATED PATENT APPLICATION

This application claims priority to U.S. Provisional Application No. 62/865,754, which was filed on Jun. 24, 2019, and is herein incorporated by reference in its entirety.

BACKGROUND

As wireless communication becomes more ubiquitous, the number of access points for a given network are increasing. Residential as well as commercial locations rely on multiple access points, such as repeaters, to extend wireless communication capabilities throughout a location. Some forms of wireless communication, such as voice over Wi-Fi ("VoWiFi") calls, demand a low level of communication latency in order to properly function. When a user device travels within a location using one or more access point during a VoWiFi call on a wireless network, call failures or handoffs to a cellular network may occur if the wireless network does not properly route incoming network traffic to the user device as it disassociates with a first access point and subsequently associates with a second access point. These and other considerations are addressed by the systems, methods, and apparatuses described herein.

SUMMARY

It is to be understood that both the following general description and the following detailed description are exemplary and explanatory only and are not restrictive, as claimed. Provided are methods and systems for device routing management. An access point for a wireless network may monitor network traffic and determine a type of network traffic for each packet of data processed by the wireless network. For example, the access point may determine that a number of packets addressed to a client device are considered a high-priority traffic type, such as traffic associated with a voice over Wi-Fi call. The access point may determine that the client device has associated with another access point. The access point, or the client device, may send a message to a gateway and/or other access point associated with the wireless network. As an example, the access point, or the client device, may send a gratuitous address resolution protocol ("ARP") message to any gateway and/or other access point with which the access point, or the client device, communicates. Each gateway and/or access point may have an ARP cache table that stores information regarding wireless connections between it and each device of the wireless network with which it communicates. The gratuitous ARP message may cause each ARP cache table of each gateway and/or access point associated to be updated to indicate the client device has associated with the other access point, thereby enabling proper routing of network traffic to the client device.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems:

FIGS. 2A-2C show example network messages;
FIG. 3 shows a flowchart of an example method.

DETAILED DESCRIPTION

Figure 1A:
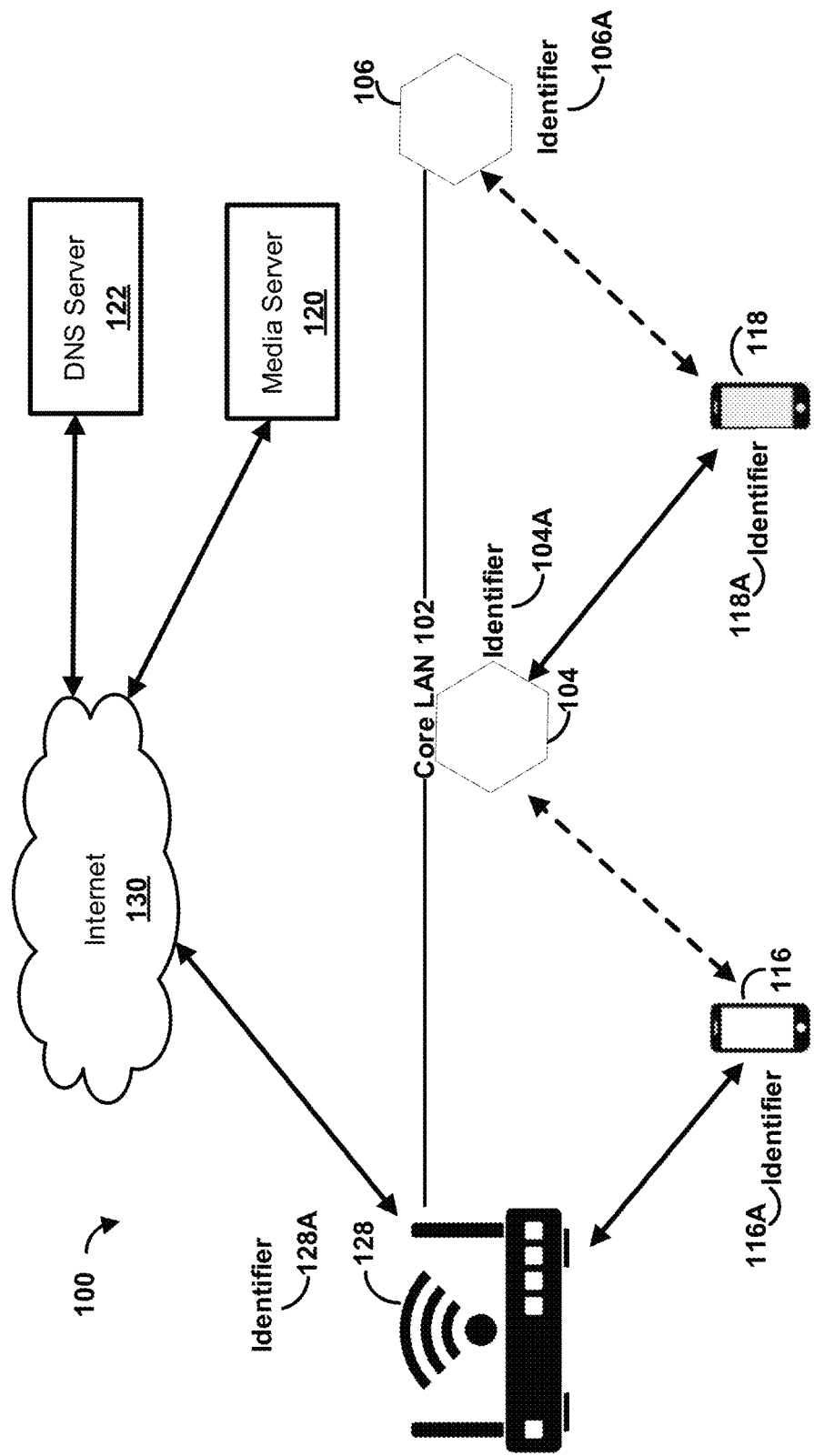
FIG. 1A shows a block diagram of an example network.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description and the examples included therein and to the Figures and their previous and following description. As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, flash memory internal or removable, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

The present disclosure relates to systems, methods, and apparatuses for device routing management. Residential as well as commercial locations rely on multiple access points, such as repeaters, to extend wireless communication capabilities throughout a location. Some forms of wireless communication, such as voice over Wi-Fi ("VoWiFi") calls demand a low level of communication latency in order to properly function. When a client device, such as a mobile phone, computer, etc., travels within a location using one or more access point during a VoWiFi call on a wireless network, call failures or handoffs to a cellular network may occur if the wireless network does not properly route incoming network traffic to the client device as it disassociates with a first access point and subsequently associates with a second access point.

In scenarios in which multiple access points, such as repeaters, are used in a wireless network to repeat a signal of a gateway device, such as a router, the internet protocol ("IP") address of the client device does not change as the client device moves from a first access point to a second access point. When the client device associates with the second access point, an identifier, such as a media access control ("MAC") address, of the second access point becomes associated with the client device. Consequently, downstream network traffic addressed to the client device's IP address that is received by the gateway device after the client device associates with the second access point must be routed based on the second access point's identifier to the second access point in order to ensure the client device timely receives the incoming network traffic.

In order to accommodate the client device as it disassociates from one access point and subsequently associates with a second access point, the wireless network (e.g., the gateway device) periodically updates an address resolution protocol ("ARP") cache to keep track of the MAC of the given access point that is currently serving the client device. While static, periodic updates to the ARP cache may be sufficient for most types of network traffic, real-time traffic network may be impacted by slower or a sub-optimal frequency of ARP cache updates. As an example, VoWiFi traffic, such as carrier grade Wi-Fi calling on cellular devices, video calling platforms, and gaming applications require a low level of latency to properly function. VoWiFi calls may be degraded, dropped, and/or transferred to a cellular network when a client device moves from a first access point to a second access point and the corresponding ARP cache is not timely updated.

Existing solutions to the latency problems discussed above include the use of a static timer that controls the frequency with which the ARP cache is updated (e.g., when an ARP cache timer expires, the ARP cache is updated). The use of static timers may flood the wireless network with an excessive number of ARP updates when the static timer is set to a low value and/or is type-agnostic with respect to a type of network traffic (e.g., when all network traffic is assigned a same level of priority). Such administrative overhead may cause network traffic to be unnecessarily throttled (e.g., due to bandwidth and/or processing constraints).

The present methods, systems, and apparatuses, provide both client-based and host-based improvements to wireless networks when processing high-priority network traffic, such as the VoWiFi calls, gaming applications, and video call platforms discussed above. Access points (e.g., hosts) may be dynamically tuned such that an ARP cache update frequency may be based on a type of network traffic and/or client device movement. For example, the client device may disassociate with a current access point and subsequently associate with another access point on the wireless network. In response to the client device detecting the association with the another access point, and/or based on a determination that the client device is processing network traffic that is a high-priority traffic type, the client device may force each respective ARP cache table of each device of the wireless network to be updated. The client device may cause the ARP cache tables to be updated by sending an ARP broadcast, such as a gratuitous ARP message. As discussed herein, the client device may send the gratuitous ARP message to the access point with which the client device is currently associated. That access point may then forward the gratuitous ARP message to each device of the wireless network on the client device's behalf. This allows the wireless network to know the identifier of the access point currently serving the client device, thereby enabling proper routing of network traffic.

FIG. 1A is a block diagram illustrating an example network 100 for device routing management in accordance with the descriptions herein. As shown, network 100, which can be referred to as a "core network" or a "wireless network," may include a core local access network (LAN) 102 that provides the wired and/or wireless infrastructure for the network 100. A plurality of access points (AP) 104 and 106 may be in communication with the core LAN 102. Each AP 104 and 106 may be a networking device having at least one transceiver and at least one embedded processor. Each AP 104 and 106 may further include a 10/100 Base-T Ethernet connection, an 802.11 interface(s), and/or any type of high-speed connection suitable for communicating with to the core LAN 102. Each AP 104 and 106 may be configured to remain in a fixed location, such as on a building rooftop or in a building ceiling, and each may be provided with a permanent source of power, such as alternating current or any other suitable power source.

Each AP 104 and 106 operates to provide access for client devices, such as client devices 118 and 116, to services provided by the network 100. Each AP 104 and 106 may also provide a respective fixed and known position and location reference, relay and/or wireless routing for client devices 118 and 116 within its area of coverage. Each AP 104 and 106 can be referred to generally as a "fixed node" on the network 100, while the client devices 118 and 116 can each be referred to as a "mobile node." Each AP 104 and 106 can also function as access points to the network 100 for client devices 118 and 116 forming an ad-hoc network.

The network 100 may further include a media server 120 for delivering types of media such as video and multimedia data to the core LAN 102, and a domain name server (DNS) 122 for translating Internet domain names into Internet Protocol (IP) addresses in a manner as known in the art. The network 100 may also include an IP gateway 128 which provides data access between the network 100 and the Internet 130. Each AP 104 and 106, the IP gateway 128, as well as each client device 118 and 116 (collectively, the "devices") may be described herein as being associated with an identifier. The identifier associated with a given device may be unique with respect to the remaining devices. The identifiers for the devices may be used to route traffic of the network 100 between and among each of the devices. While the description of the network 100 herein may refer to the identifiers as being MAC addresses, it is to be understood that the network 100 may be operable using other types of identifiers, such as internet protocol ("IP") addresses, universally unique identifiers ("UUIDs"), or the like.

As used herein, the terms "AP" or "node" or "fixed node" may be used interchangeably, as well as the terms "client device" and "mobile node." The APs 104 and 106 on the core LAN 102 may be fully connected to a single virtual segment. As can be appreciated by one skilled in the art, all APs 104 and 106 (fixed nodes) on the virtual segment are directly accessible from any other node at a logical link layer of the network 100. The IP subnet for this virtual segment may be large enough to encompass all of the APs 104 and 106, and all client devices 118 and 116 in a single broadcast domain. The virtual segment may include media access control layer (MAC-layer) bridges and switches (not shown) between the APs 104 and 106, as needed, to filter unicast frames from using bandwidth on non-required links.

The APs 104 and 106 may have two network interfaces, one of which may be connected to the network 100 via a wire-line link, and the other being a wireless transceiver. Both of these interfaces may be assigned IP addresses from the core network's 100 IP subnet. IP addresses outside the core network's 100 subnet may be reachable via the core network's 100 directly accessible IP gateway 128.

The AP 104 or 106 may monitor network traffic and determine a type of network traffic for each packet of data processed by the network 100 based on determining that a given packet of the data is associated with a Wi-Fi multimedia category (e.g., "voice"/AC_VO), a size of a packet of the data, a protocol type associated with a packet of the data, a frequency with which a similar packet of the data is received (e.g., a packet of the data associated with the protocol type), a destination associated with a packet of the data (e.g., an identifier indicative of a voice over WiFi device), a combination thereof and/or the like. The AP 104 or 106 may determine that a portion of network traffic associated with a mobile node (e.g., client devices 118 and 116) is a high-priority traffic type (e.g., VoWiFi data). As the mobile node (e.g., client devices 118 and 116) associates with an AP 104 or 106, the respective AP may add that mobile node's IP address to its routing table (e.g., an ARP cache table) indicating that this mobile node is directly accessible via the wireless transceiver (e.g., the MAC address of the AP's wireless transceiver). This may override the default subnet-wide entry only for this particular mobile node. It is noted that the mobile node may associate with an AP via a direct communication link or via other mobile nodes in the ad-hoc network already affiliated with the respective AP. As an example, the client device 116 may initially associate with the AP 104.

Accordingly, the AP 104 may add the IP address of client device 116 to its own routing table, indicating that this client device 116 is directly accessible via the wireless transceiver of the AP 104. Upon doing so, the AP 104 may begin acting as the client device's 116 proxy on the core network 100. The AP 104 may then answer to address resolution requests, such as address resolution protocol (ARP) requests, on the core network 100 for the client device's 116 IP address as if it were the client device 116. Other nodes on the core network 100, such as the AP 106, as well as the media server 120, DNS server 122, and/or IP gateway 128, may then associate the IP address of the client device 116 to the identifier of the wireless interface of the AP 104 (e.g., a MAC address) via their respective ARP cache tables. When a packet of network traffic that is addressed to the client device 116 is received by the AP 104, the AP 104 may consult its IP routing table and forward the packet on to the proper interface, which may be the wireless transceiver of the AP 104. This allows the AP 104 to be a "point of presence" on the core network 100 to represent the client device 116 as a proxy.

As each of the client devices 118 and 116 moves from a first AP, such as AP 104, to a second AP, such as AP 106, the IP address of each of the client devices 118 and 116 may remain the same (e.g., each of the APs 104 and 106 are repeating the signal of the gateway 128); however the identifier of the AP currently serving each of the client devices 118 and 116 may change from the identifier of the AP that was previously serving the client device to the identifier of the AP now currently serving the client device. For example, if the client device 116 disassociates from the gateway 128 and subsequently associates with the AP 104, after having received traffic at the gateway 128, other nodes on the network (e.g., AP 106, media server 120, and/or DNS server 122) may be unaware of the change unless certain measures are taken. Consequently, absent those measures, each node's respective ARP cache table may associate the IP of the client device 116 (e.g., IP address 116A) to the identifier of the gateway 128 (e.g., identifier 128A), and packets send via an uninformed node (e.g., media server 120, DNS server 122 and/or IP gateway 124) may never reach the new AP 104 (e.g., the packets may not be properly routed to the identifier 104A). As another example, if the client device 118 disassociates from the AP 104 and subsequently associates with the AP 106, after having received traffic at the AP 104, other nodes on the network (e.g., gateway 128, media server 120, and/or DNS server 122) may be unaware of the change unless certain measures are taken. Consequently, absent those measures, each node's respective ARP cache table may associate the IP of the client device 118 (e.g., IP address 118A) to the identifier of the AP 104 (e.g., identifier 104A), and packets send via an uninformed node (e.g., media server 120, DNS server 122 and/or IP gateway 128) may never reach the new AP 106 (e.g., the packets may not be properly routed to the identifier 106A).

As an example, the AP 104 may determine that the client device 116 has disassociated with it (or any other access point of the wireless network) and has associated with the AP 106. The AP 104 may determine that the client device 116 has disassociated with it (or any other access point of the wireless network) by determining that the client device 116 has associated with (e.g., is now in communication with) the AP 106. The AP 104 may then cause each ARP cache table of each gateway and/or host device associated with the network 100 to be updated (e.g., access points, gateways, repeaters, switches, etc.). The AP 104 may cause each device to update an ARP cache table entry to indicate the client device 116 is associated with network traffic that is a high-priority traffic type, such as a VoWiFi call, and to identify the AP 106 as the current host for the client device 116 (e.g., the device with which the client device 116 is currently associated and using to communicate with the network 100). This allows the network 100 to know the identifier of the AP 106, which is currently serving the client device, thereby enabling proper routing of network traffic. The AP 104 may cause each respective ARP cache table entry of each device to be updated by the AP 104 sending a gratuitous ARP message, as further discussed herein, to each device associated with the network 100.

The gratuitous ARP message may be received by each gateway and/or host device associated with the network 100 and each may subsequently update its respective ARP cache table entry. Each ARP cache table entry may include a time-to-live element (e.g., a timer). The time-to-live element may be configured to be a specified length of time, as compared to a default length of time, based on a determination that the portion of network traffic is a high-priority traffic type. For example, the time-to-live element for an ARP cache entry associated with the client device 116, which may be conducting a VoWiFi call or processing another type(s) of high-priority traffic, may be a lesser duration (e.g., 500 milliseconds) as compared to a default value (e.g., 1 second) for network traffic that is not high-priority. Once the time-to-live element has expired (e.g., the lesser duration time has elapsed), the gateway and/or host device may then send an ARP request message to each of the gateways and/or host devices on the network 100 in order to ascertain a current association of the client device 116 (e.g., to determine which gateway and/or host device of the is currently serving the client device 116).

Each ARP cache table entry for each respective gateway and/or host device may be configured based on a number of client devices 116,118 associated with the network 100 and/or a traffic type for each of the client devices 116,118. As an example, if the network 100 has 5 client devices associated with it (not all shown), and each of the 5 client devices is processing active, real-time voice traffic (e.g., high-priority, such as a VoWiFi call), then each time-to-live element associated with each of the 5 client devices may be set to a low value as compared to a default value. In this way, frequent updates to each respective ARP cache table entry across the network 100 are facilitated, which may ensure that real-time (e.g., high-priority) traffic is efficiently and timely delivered to the intended AP 104,106 and/or gateway 128 currently serving each respective client device.

As another example, if the wireless network has 5 client devices associated with it (not all shown) and only the client device 116 is processing active, real-time voice traffic (e.g., a VoWiFi call), then the time-to-live element for the ARP cache table entry associated with the client device 116 may be set to a lower-than-default value, thereby enabling more rapid ARP updates, while each of the other client devices may be associated with a respective ARP cache table entry that has a default value for the time-to-live element. In this way, the network 100 may not be flooded with excessive ARP update messages. As a further example, if the network 100 has only the client devices 116,118 associated with it, and each of the two client devices 116,118 is processing non-real time traffic and/or each client device is determined to be stationary for a period of time (e.g., not moving between AP 104 and AP 106), then the time-to-live element for the ARP cache table entries associated with each of the two client devices 116,118 may be set to a default value.

The foregoing example configurations allow the network 100 to quickly reconfigure itself as the number of client devices 116,118 increases; traffic types for one or more of the client devices 116,118 changes (e.g., non-real-time to real-time traffic); and/or one or more of the client devices 116,118 moves from AP 104 to AP 106 (or vice-versa). In this way, the network 100 may be able to adequately balance the needs of high-priority network traffic for some client devices while maintaining network efficiency for other client devices processing lower-priority network traffic.

While the description herein, for the sake of simplicity, indicates that the AP 104 or the AP 106 sends a gratuitous ARP message upon determining that the client device 116 (or the client device 118) is processing high-priority network traffic and/or recently associated with a new AP, it is to be understood that the client devices 116,118 themselves may send a gratuitous ARP message (e.g., on its own behalf). For example, the client device 116 may send a gratuitous ARP message to the AP 104 following the client device 116 associating with the AP 104. The AP 104 may then forward the gratuitous ARP message to the AP 106, the gateway 128, and/or the client device 118. As another example, the client device 116 may detect (e.g., based on a traffic identifier in a MAC layer packet) that the client device 116 is processing network traffic that is a high-priority traffic type. The client device 116 may detect that it is processing such traffic in the same way as discussed herewith with respect to the AP 104 and/or the AP 106. The client device 116 may determine that it is processing high-priority traffic based on one or more packets of processed network traffic being associated with a WiFi multimedia category (e.g., a protocol type) set to "voice" (e.g., AC_VO); a size of each of the one or more packets, a traffic type associated with each of the one or more packets; a frequency with which a packet that is similar to the one or more packets is received; a destination associated with the one or more packets (e.g., an identifier indicative of a voice over WiFi device); a combination thereof and/or the like. The client device may be currently associated with the AP 104. After the client device 116 determines that it is processing high-priority traffic, the client device 116 may send a gratuitous ARP message to the AP 104. The AP 104 may then forward the gratuitous ARP message to the AP 106, the gateway 128, and/or the client device 118.

As another example, to ensure that packets of network traffic are properly routed to a current hosting device (e.g., a current AP serving a client device), a gratuitous ARP message may be sent via the client devices 116, 118 and/or any of the gateway 128, AP 104, or AP 106. The gratuitous ARP message may force an update to the ARP cache tables of the other nodes (e.g., APs 104 and 106, media server 120, DNS server 122 and IP gateway 128) on the network 100 to the client device's new point of presence, as discussed herein. As an example, if the client device 118 disassociates from the AP 104 and subsequently associates with the AP 106, after having received traffic at the AP 104, the gratuitous ARP message may force the AP 104, the gateway 128, the media server 120, and/or the DNS server 122 to update their respective ARP cache tables. As a result of the gratuitous ARP message forcing each of these devices of the network 100 to update their respective ARP cache tables, each devices of the network 100 may then associate the IP address 118A of the client device 118 to the identifier 106A of the AP 106 currently serving the client device 118. The prior route for packets of network traffic (e.g., to client device 118 via AP 104 and identifier 104A) may be maintained in each respective ARP cache table for a configurable period of time to ensure that packets of network traffic continue to reach the client device 118 while the network routing is being updated. This ensures an uninterrupted packet stream is maintained for the client device 118. During this configurable period of time, no packets of downstream network traffic addressed to the client device 118 may be forwarded from AP 104 to AP 106 (e.g., packets of network traffic are delivered directly to the client device 118 without adding an extra network hop).

The broadcast of the reconfiguration notification, that is, the gratuitous ARP message, may on occasion be unreliable or may not immediately be processed by one or more of the devices on the network 100. Continuing with the above example, the media server 120 may receive and process a gratuitous ARP message received from or via the AP 106, and the media server 120 may then begin sending packets intended for the client device 118 to the new AP 106 with which the client device 118 has recently associated. However, the DNS server 122 may either not have received the gratuitous ARP message or may not yet have processed the gratuitous ARP message. Accordingly, the DNS server 122, and all other devices that have either not received or have not yet processed the gratuitous ARP message, may continue to send packets intended for the client device 118 to the AP 104. Once the DNS server 122 has processed the gratuitous ARP message, the DNS server 122 may then begin to send packets intended for the client device 118 to the AP 106.

Continuing further with this example, if the AP 104 continues to receive packets intended for the client device 118 after a configurable period of time (e.g., a few seconds) after the gratuitous ARP message has been issued by/via the AP 106, it may be determined that one or more devices of the network 100 may have missed the broadcast of the gratuitous ARP message. To overcome this unreliability, a selective retry mechanism may be implemented. For example, the AP 104 may send a notification to all devices of the network 100. This notification may either be a broadcast notification, such as a gratuitous ARP message, or it may be a unicast message to the one or more devices of the network 100 that are continuing to send packets intended for the client device 118 to the AP 104. This retry mechanism may be triggered a configurable number of times to complete the network reconfiguration (e.g., to ensure all respective ARP cache tables have been updated). After the configurable period of time, if the AP 104 receives no packets of network traffic intended for the client device 118, it may be assumed that all packets on the network 100 addressed to the client device 118 are now being properly routed to the AP 106. The AP 106 may then send a message to the AP 104—with which the client device 118 was previously associated—that causes the AP 104 to remove any ARP cache entry indicative of a network mapping between the IP address 118A of the client device 118 and the identifier 104A of the AP 104.

Figure 1B:
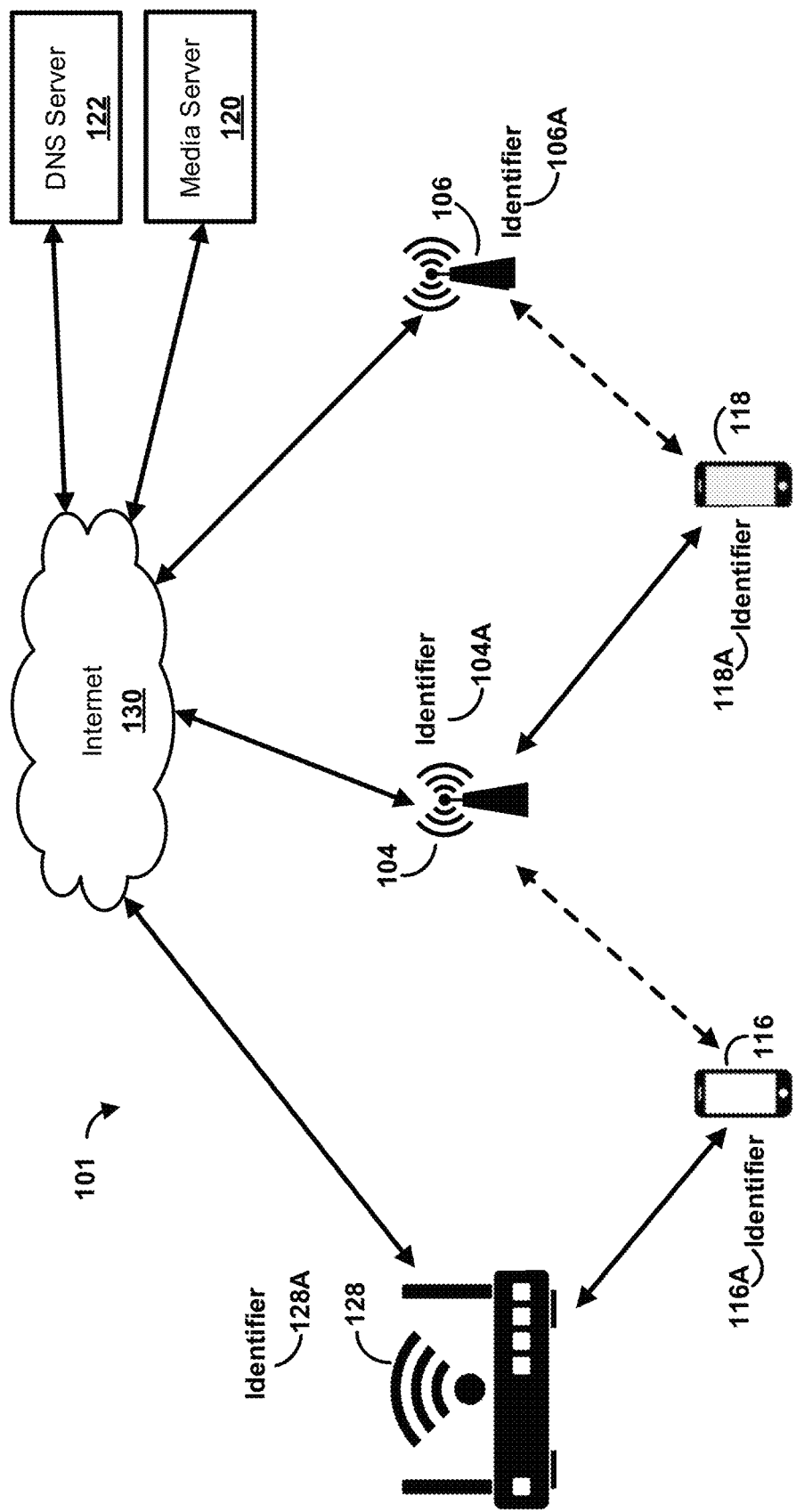
FIG. 1B shows a block diagram of an example network.

Turning now to FIG. 1B, a network 101 is shown. The network 101 may be an alternate configuration of the network 100 shown in FIG. 1A. As shown in FIG. 1B, the network 101 may not include the core LAN 102 of the network 100 shown in FIG. 1A. The AP 104 and the AP 106 as shown in the network 101 may be network repeaters, network bridges, access points, a combination thereof, and/or the like. As shown in FIG. 1B, the AP 104, the AP 106, the gateway 128, the DNS server 122, and the media server 120 may each be in communication with the Internet 130 via wired or wireless means. The devices of the network 101 may function according to the description herein with respect to the devices shown in the network 100 for device routing management. Rather than using the core LAN 102 as shown in the network 100, the APs 104 and 106 of the network 101 may be fully connected to a single virtual segment via the Internet 130. The APs 104 and 106 of the network 101 may be directly accessible from any other node/device of the network 101 at a logical link layer of the network 101 via the virtual segment. The IP subnet for the virtual segment of the network 101 may include the APs 104 and 106 and the client devices 118 and 116 in a single broadcast domain. The virtual segment of the network 101 may include MAC-layer bridges and switches (not shown) between the APs 104 and 106, as needed, to filter unicast frames from using bandwidth on non-required links. It is to be understood that the network 101 is meant to be exemplary only. Other alternate configurations of the network 100 are possible, while retaining the functionality of the network 100 and the devices described herein.

Turning now to FIGS. 2A-2C, example network messages are shown. FIG. 2A shows an example ARP cache table entry for an access point, such as the AP 104 and/or the AP 106 discussed above in FIGS. 1A and 1B. As shown in FIG. 2A, the ARP cache table entry may indicate a device address for a client device, such as either the client device 118 and/or the client device 116 (e.g., the device address may correspond to the IP address 116A or the IP address 118A). As also shown in FIG. 2A, the ARP cache table entry may indicate a hardware address associated with the device address. The hardware address shown in FIG. 2A may indicate an identifier for a first access point that is currently serving a client device.

FIG. 2B shows an example gratuitous ARP message as discussed herein. The gratuitous ARP message shown in FIG. 2B may be generated by a client device and forwarded to each of the network devices (e.g., each access point, gateway, router, switch, etc. on a network) by a second access point that is now serving the client device (e.g., in response to the client device having disassociated from the first access point and subsequently associating with the second access point). Alternatively, or in addition, the gratuitous ARP message may be generated by the first access point that was previously serving the client device or by the second access point that is now serving the client device. The gratuitous ARP message may indicate a broadcast address of "FF:FF:FF:FF:FF:FF," thereby indicating the gratuitous ARP message is to be sent to each device associated with the network. The gratuitous ARP message may indicate a sender identifier (e.g., a MAC address) and a source identifier (e.g., a MAC address) that each correspond to the second access point that is now serving the client device. The target IP address and the sender IP address of the gratuitous ARP message may each indicate the IP address of the client device. Finally, the target identifier of the gratuitous ARP message may indicate a broadcast address of "FF:FF:FF:FF:FF:FF."

FIG. 2C shows the example ARP cache table entry from FIG. 2A after being updated (e.g., by a network device) in response to receiving the gratuitous ARP message shown in FIG. 2B. For example, the ARP cache table entry shown in FIGS. 2A and 2C may correspond to the ARP cache table for the gateway 128 of FIGS. 1A and/or 1B. Upon receiving the gratuitous ARP message, the gateway 128 may update the ARP cache table entry associated with the client device to indicate the client device is now being served by the second access point having an identifier (e.g., a MAC address) of the second access point. As seen in FIG. 2C, the ARP cache table entry indicates the same device address (e.g., IP address) for the client device. Accordingly, when the gateway 128 receives downstream network traffic addressed to the client device (e.g., addressed to IP address 10.0.0.01), the gateway 128 may properly direct the network traffic to the client device via the second access point (e.g., the gateway 128 may route the network traffic to the second access point based on the identifier (e.g., MAC address) of the second access point stored in the updated ARP cache table entry). In this way, network traffic intended for the client device may be appropriately and timely routed to the client device to avoid any degradation or disruption of services on the client device (e.g., a VoWiFi call, a video call, etc.).

FIG. 3 is a flowchart illustrating an example method 300, which may be implemented using any of the devices shown in FIGS. 1A and/or 1B. At step 302, a first device of a plurality of devices (e.g., a plurality of network devices) may determine that a portion of network traffic at the first device is a high-priority traffic type (e.g., data associated with a VoWiFi call). For example, first device may determine that the portion of network traffic at the first device comprises voice call data received from a user device via WiFi. The first device may be either of the APs 104 and 106 or the gateway 128 of FIGS. 1A and/or 1B. The first device may monitor network traffic and determine a type of network traffic for each packet of data processed by the first device based on the first device determining that a given packet of data is associated with a Wi-Fi multimedia category, a size of the packet, a protocol type associated with the packet, a frequency with which a similar packet is received, a destination associated with the packet (e.g., an identifier indicative of a voice over WiFi device), a combination thereof and/or the like. The user device, such as the user device 116 or 118 of FIGS. 1A and/or 1B, may be initially associated with the first device (e.g., the VoWiFi call is being processed by the user device).

The first device may determine based on the portion of network traffic that the user device is a participant of the VoWiFi call. At step 304, the first device may determine that the user device is no longer in communication with the first device. For example, the first device may determine that the user device has disassociated with the first device. As an example, the user device may move away from the first device and toward a second device, such as another access point on the network. The user device may then use the second device for communicating with the network. In this example, the first device may determine that the user device has disassociated with the first device by determining that the user device has associated with (e.g., is now in communication with) the second device. At step 306, the first device may send an address resolution protocol (ARP) message, such as a gratuitous ARP message as described above, to any device(s) of the plurality of devices with which the first device communicates. The first device may send the ARP message based on the user device having disassociated with the first device (e.g., based on the user device no longer being in communication with the first device). The first device may send the ARP message based on the determination that the portion of network traffic comprises voice call data (e.g., the VoWiFi call). The ARP message may cause each of the plurality of devices to update a respective ARP table entry to indicate the user device has associated with the second device.

Each ARP cache table entry may include a time-to-live element (e.g., a timer). The time-to-live element may be based on the determination that the portion of network traffic is a high-priority traffic type (e.g., the VoWiFi call). For example, the time-to-live element for an ARP cache entry for a user device conducting a VoWiFi call may be less than a default value for other types of network traffic. Once the time-to-live element has expired (e.g., an amount of time has elapsed), the respective device may then send an ARP request message to each of the other devices of the plurality of devices in order to ascertain a current association of the user device (e.g., to determine which device of the plurality of devices is currently serving the user device).

The ARP message may be generated by the first device. The ARP message may indicate a broadcast address, such as "FF:FF:FF:FF:FF:FF," thereby indicating the ARP message is to be sent to each of the plurality of devices. The ARP message may indicate a sender identifier (e.g., MAC address) and a source identifier (e.g., a MAC address) that each correspond to the second device. A target IP address and a sender IP address of the ARP message may each indicate an IP address of the user device. A target identifier (e.g., MAC address) of the ARP message may indicate a broadcast address, such as "FF:FF:FF:FF:FF:FF."

Upon receiving the ARP message, the plurality of devices may each update respective ARP cache table entries associated with the user device to indicate the user device is now being served by the second device. As an example, a third device, such as a gateway (e.g., gateway 128) may update its respective ARP cache table entry to indicate the user device's IP address is now associated with the identifier of the second device. Accordingly, when the third device receives downstream network traffic addressed to the user device's IP address, the third device may properly direct the network traffic to the user device via the second device based on the identifier of the second device being associated with the user device's IP address in the updated ARP cache table entry. In this way, network traffic intended for the user device may be appropriately and timely routed to the user device to avoid any degradation or disruption of services on the user device (e.g., a VoWiFi call, a video call, etc.).

Figure 4:
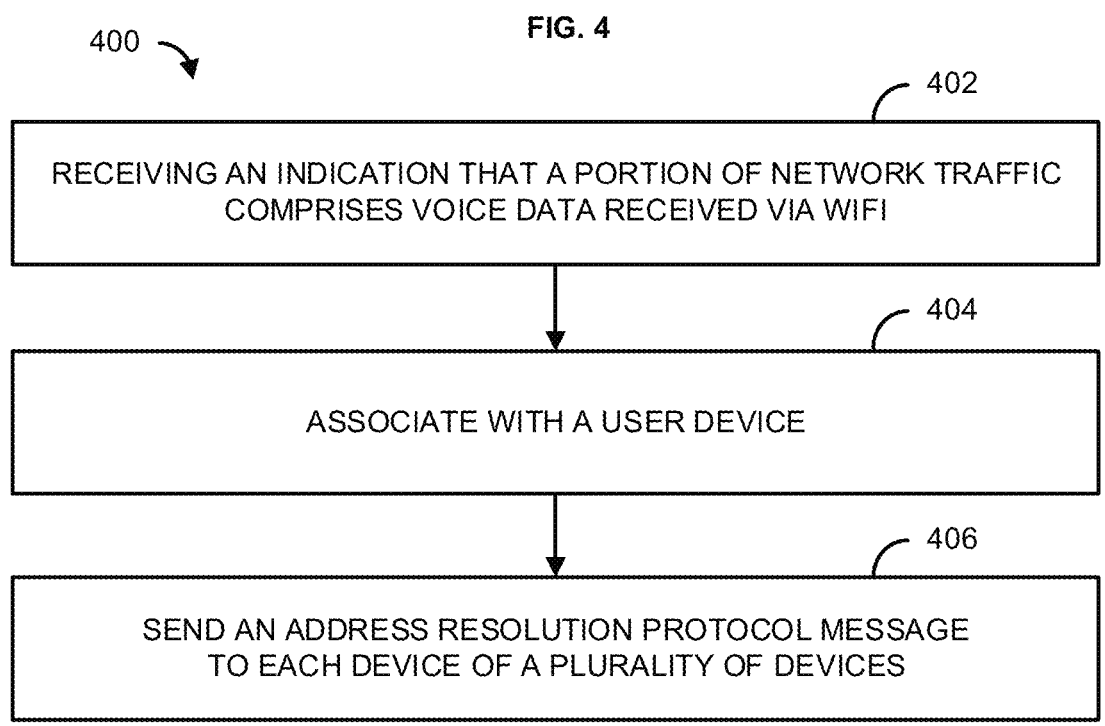
FIG. 4 shows a flowchart of an example method.

FIG. 4 is a flowchart illustrating an example method 400, which may be implemented using any of the devices shown in FIGS. 1A and/or 1B. At step 402, a first device of a plurality of devices (e.g., a plurality of network devices) may determine that a portion of network traffic at the first device is a high-priority traffic type (e.g., data associated with a VoWiFi call). For example, the first device may determine that a portion of network traffic at the first device comprises voice call data received from a user device via WiFi. The first device may be either of the APs 104 and 106 or the gateway 128 of FIGS. 1A and/or 1B. The first device may monitor network traffic and determine a type of network traffic for each packet of data processed by the first device based on the first device determining that a given packet of data is associated with a Wi-Fi multimedia category, a size of the packet, a protocol type associated with the packet, a frequency with which a similar packet is received, a destination associated with the packet (e.g., an identifier indicative of a voice over WiFi device), a combination thereof and/or the like. The user device, such as the user device 116 or 118 of FIGS. 1A and/or 1B, may be initially associated with the first device (e.g., the portion of network traffic that the VoWiFi call is being processed by the user device).

At step 404, a second device of the plurality of devices may associate with the user device. As an example, the user device may move away from the first device and toward a second device, such as another access point on the network. The user device may then associate with the second device and use it for communicating with the network. At step 406, the second device may send an address resolution protocol (ARP) message, such as a gratuitous ARP message as described above, to any device(s) of the plurality of devices with which the second device communicates. The second device may send the ARP message based on the user device having associated with the second device and/or based on a determination that the portion of network traffic at the first device comprises voice call data received from the user device via WiFi (e.g., the VoWiFi call). The ARP message may cause each of the plurality of devices to update a respective ARP table entry to indicate the user device has associated with the second device.

Each ARP cache table entry may include a time-to-live element (e.g., a timer). The time-to-live element may be based on the determination that the portion of network traffic is a high-priority traffic type (e.g., the VoWiFi call). For example, the time-to-live element for an ARP cache entry for a user device conducting a VoWiFi call may be less than a default value for other types of network traffic. Once the time-to-live element has expired (e.g., an amount of time has elapsed), the respective device may then send an ARP request message to each of the other devices of the plurality of devices in order to ascertain a current association of the user device (e.g., to determine which device of the plurality of devices is currently serving the user device).

The ARP message may be generated by the second device. The ARP message may indicate a broadcast address, such as "FF:FF:FF:FF:FF:FF," thereby indicating the ARP message is to be sent to each of the plurality of devices. The ARP message may indicate a sender identifier (e.g., a MAC address) and a source identifier (e.g., a MAC address) that each correspond to the second device. A target IP address and a sender IP address of the ARP message may each indicate an IP address of the user device. A target identifier (e.g., MAC address) of the ARP message may indicate a broadcast address, such as "FF:FF:FF:FF:FF:FF."

Upon receiving the ARP message, the plurality of devices may each update respective ARP cache table entries associated with the user device to indicate the user device is now being served by the second device. As an example, a third device, such as a gateway (e.g., gateway 128) may update its respective ARP cache table entry to indicate the user device's IP address is now associated with the identifier of the second device. Accordingly, when the third device receives downstream network traffic addressed to the user device's IP address, the third device may properly direct the network traffic to the user device via the second device based on the identifier of the second device being associated with the user device's IP address in the updated ARP cache table entry. In this way, network traffic intended for the user device may be appropriately and timely routed to the user device to avoid any degradation or disruption of services on the user device (e.g., a VoWiFi call, a video call, etc.).

Figure 5:
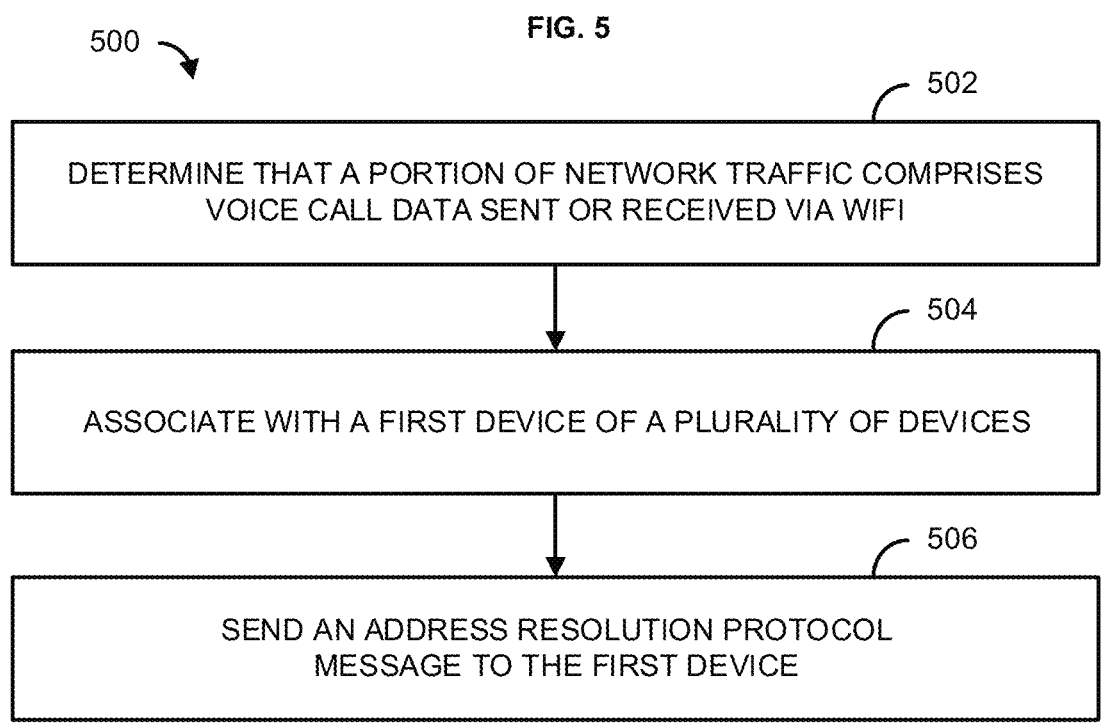
FIG. 5 shows a flowchart of an example method.

FIG. 5 is a flowchart illustrating an example method 500, which may be implemented using any of the devices shown in FIGS. 1A and/or 1B. At step 502, a user device, such as the user device 116 or 118 of FIGS. 1A and/or 1B, may determine that a portion of network traffic processed at the user device is a high-priority traffic type (e.g., data associated with a VoWiFi call). For example, the user device may determine that a portion of network traffic processed at the user device comprises voice call data sent or received via WiFi. The user device may monitor network traffic it is processing and determine a type of network traffic for each packet of data processed based on the user device determining that a given packet of data is associated with a Wi-Fi multimedia category, a size of the packet, a protocol type associated with the packet, a frequency with which a similar packet is received, a destination associated with the packet (e.g., an identifier indicative of a voice over WiFi device), a combination thereof and/or the like. At step 504, the user device may associate with a first device of a plurality of devices. As an example, the user device may move toward the first device, such as an access point on the network (e.g., either of the APs 104 and 106 or the gateway 128 of FIGS. 1A and/or 1B). The user device may use the first device for communicating with the network.

At step 506, the user device may send an address resolution protocol (ARP) message, such as a gratuitous ARP message as described above, to each of the plurality of devices. The user device may send the ARP message based on the user device having associated with the first device and/or based on the portion of network traffic at the user device comprising voice call data sent or received via WiFi (e.g., the VoWiFi call). The ARP message may cause each of the plurality of devices to update a respective ARP table entry to indicate the user device has associated with the first device.

Each ARP cache table entry may include a time-to-live element (e.g., a timer). The time-to-live element may be based on the determination that the portion of network traffic is a high-priority traffic type (e.g., the VoWiFi call). For example, the time-to-live element for an ARP cache entry for a user device conducting a VoWiFi call may be less than a default value for other types of network traffic. Once the time-to-live element has expired (e.g., an amount of time has elapsed), the respective device may then send an ARP request message to each of the other devices of the plurality of devices in order to ascertain a current association of the user device (e.g., to determine which device of the plurality of devices is currently serving the user device).

The ARP message may be generated by the user device. The ARP message may indicate a broadcast address, such as "FF:FF:FF:FF:FF:FF," thereby indicating the ARP message is to be sent to each of the plurality of devices. The ARP message may indicate a sender identifier (e.g., MAC address) and a source identifier (e.g., a MAC address) that each correspond to the first device. A target IP address and a sender IP address of the ARP message may each indicate an IP address of the user device. A target identifier (e.g., a MAC address) of the ARP message may indicate a broadcast address, such as "FF:FF:FF:FF:FF:FF."

Upon receiving the ARP message, the plurality of devices may each update respective ARP cache table entries associated with the user device to indicate the user device is now being served by the first device. As an example, a second device, such as a gateway (e.g., gateway 128) may update its respective ARP cache table entry to indicate the user device's IP address is now associated with the identifier of the first device. Accordingly, when the second device receives downstream network traffic addressed to the user device's IP address, the second device may properly direct the network traffic to the user device via the first device based on the identifier of the first device being associated with the user device's IP address in the updated ARP cache table entry. In this way, network traffic intended for the user device may be appropriately and timely routed to the user device to avoid any degradation or disruption of services on the user device (e.g., a VoWiFi call, a video call, etc.).

Figure 6:
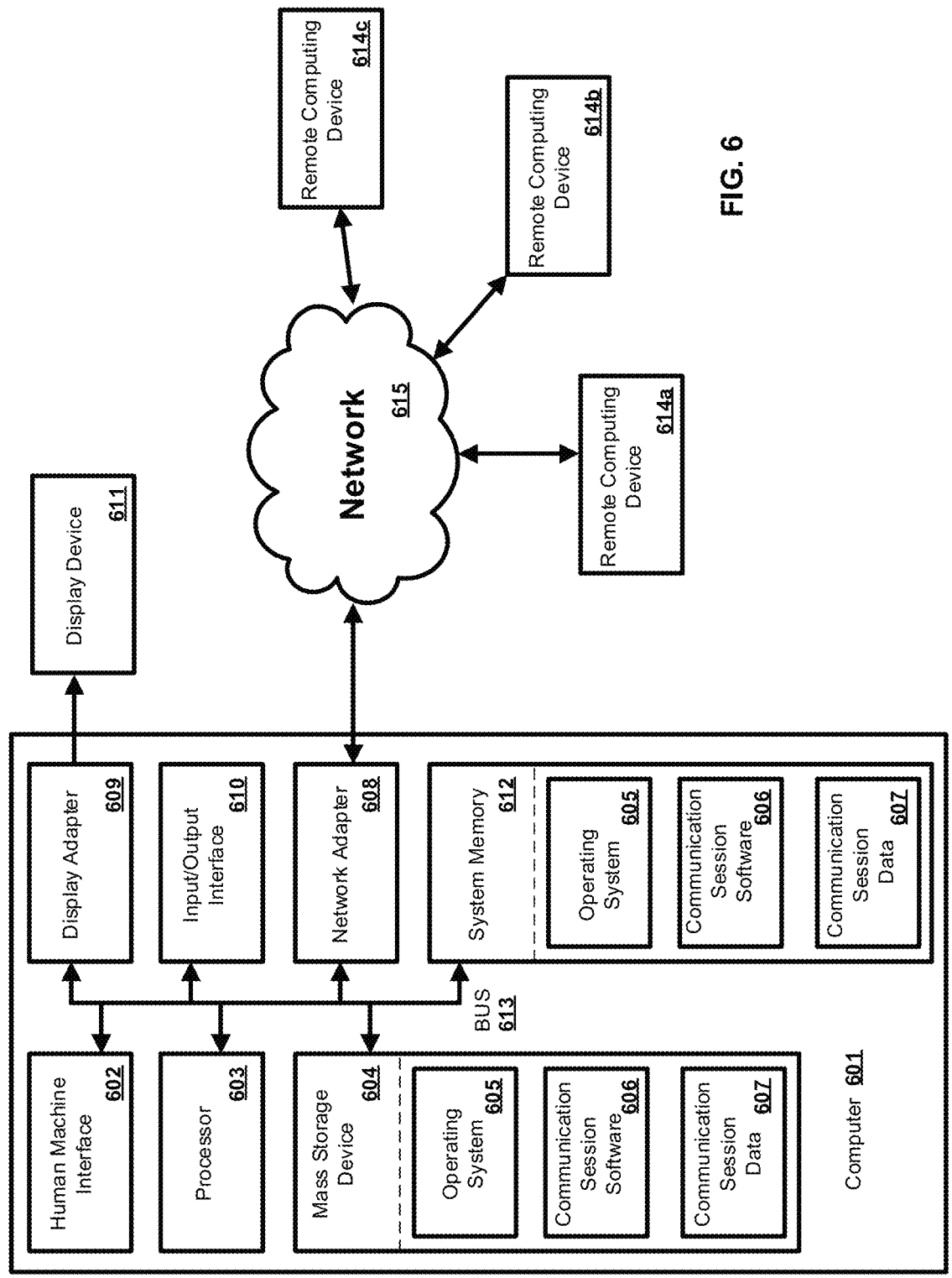
FIG. 6 shows a block diagram of an example computing device.

FIG. 6 is a block diagram illustrating an exemplary operating environment for performing the disclosed methods. In an exemplary aspect, the methods and systems of the present disclosure can be implemented on a computer 601 as illustrated in FIG. 6 and described below. By way of example, each of the devices of FIGS. 1A and/or 1B may be a computer 601 as illustrated in FIG. 6. Similarly, the methods and systems disclosed can utilize one or more computing devices to perform one or more functions in one or more locations. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well-known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 601. The components of the computer 601 can comprise, but are not limited to, one or more processors 603, a system memory 612, and a system bus 613 that couples various system components including the processor 603 to the system memory 612. In the case of multiple processors 603, the system can utilize parallel computing.

The system bus 613 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 613, and all buses specified in this description can also be implemented over a wired or wireless network connection and each of the subsystems, including the processor 603, a mass storage device 604, an operating system 605, communication session software 606, communication session data 607, a network adapter 608, system memory 612, an Input/Output Interface 610, a display adapter 609, a display device 611, and a human machine interface 602, can be contained within one or more remote computing devices 614a,b,c at physically separate locations, connected through buses of this form, in effect implementing a fully distributed system.

The computer 601 typically comprises a variety of computer readable media. Exemplary readable media can be any available media that is accessible by the computer 601 and comprises, for example and not meant to be limiting, both volatile and non-volatile media, removable and non-removable media. The system memory 612 comprises computer readable media in the form of volatile memory, such as random access memory (RAM), and/or non-volatile memory, such as read only memory (ROM). The system memory 612 typically contains data, such as communication session data 607, and/or program modules, such as operating system 605 and communication session software 606, that are immediately accessible to and/or are presently operated on by the processor 603.

In another aspect, the computer 601 can also comprise other removable/non-removable, volatile/non-volatile computer storage media. By way of example, FIG. 6 illustrates a mass storage device 604 which can provide non-volatile storage of computer code, computer readable instructions, data structures, program modules, and other data for the computer 601. For example and not meant to be limiting, a mass storage device 604 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 604, including by way of example, an operating system 605 and communication session software 606 (e.g., to facilitate ARP message sending and cache updating). Each of the operating system 605 and communication session software 606 (or some combination thereof) can comprise elements of the programming and the communication session software 606. Communication session data 607 (e.g., ARP messages and/or caches) can also be stored on the mass storage device 604. Communication session data 607 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 601 via an input device (not shown). Examples of such input devices comprise, but are not limited to, a keyboard, pointing device (e.g., a "mouse"), a microphone, a joystick, a scanner, tactile input devices, such as gloves, and other body coverings, and the like These and other input devices can be connected to the processor 603 via a human machine interface 602 that is coupled to the system bus 613, but can be connected by other interface and bus structures, such as a parallel port, game port, an IEEE 1394 Port (also known as a Firewire port), a serial port, or a universal serial bus (USB).

In yet another aspect, a display device 611 can also be connected to the system bus 613 via an interface, such as a display adapter 609. It is contemplated that the computer 601 can have more than one display adapter 609 and the computer 601 can have more than one display device 611. For example, a display device can be a monitor, an LCD (Liquid Crystal Display), or a projector. In addition to the display device 611, other output peripheral devices can comprise components, such as speakers (not shown) and a printer (not shown) which can be connected to the computer 601 via Input/Output Interface 610. Any step and/or result of the methods can be output in any form to an output device. Such output can be any form of visual representation, including, but not limited to, textual, graphical, animation, audio, tactile, and the like. The display 611 and computer 601 can be part of one device, or separate devices.

The computer 601 can operate in a networked environment using logical connections to one or more remote computing devices 614a,b,c. By way of example, a remote computing device can be a personal computer, portable computer, smartphone, a server, a router, a network computer, a peer device or other common network node, and so on. Logical connections between the computer 601 and a remote computing device 614a,b,c can be made via a network 615, such as a local area network (LAN) and/or a general wide area network (WAN). Such network connections can be through a network adapter 608. A network adapter 608 can be implemented in both wired and wireless environments. Such networking environments are conventional and commonplace in dwellings, offices, enterprise-wide computer networks, intranets, and the Internet.

For purposes of illustration, application programs and other executable program components, such as the operating system 605 are illustrated herein as discrete blocks, although it is recognized that such programs and components reside at various times in different storage components of the computing device 601, and are executed by the data processor(s) of the computer. An implementation of communication session software 606 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information, such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ artificial intelligence techniques, such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive. Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method comprising:
   determining, by a first device of a plurality of devices, that a portion of network traffic at the first device comprises voice call data received from a user device via WiFi;
   determining that the user device is no longer in communication with the first device; and
   sending, via the first device, based on:
      the user device no longer being in communication with the first device, and
      the portion of network traffic being voice call data,
   an address resolution protocol (ARP) message to each device of the plurality of devices, wherein the ARP message comprises a network mapping between an identifier of the user device and an identifier of a second device of the plurality of devices, and wherein the ARP message causes each device of the plurality of devices to update an ARP table entry to indicate the user device has associated with the second device.

2. The method of claim 1, wherein determining that the portion of network traffic at the first device comprises voice call data received from the user device via WiFi comprises:

determining, based on one or more of:
  a size of a packet associated with the portion of network traffic,
  a protocol type associated with the portion of network traffic,
  a frequency of receipt of packets associated with the protocol type, or
  a destination of the packet associated with the portion of network traffic,
  that the portion of network traffic comprises voice call data received from the user device via WiFi.

3. The method of claim 1, wherein the identifier of the second device comprises a media access controller (MAC) address.

4. The method of claim 1, wherein the identifier of the user device comprises an internet protocol (IP) address.

5. The method of claim 1, wherein a third device of the plurality of devices is a gateway device.

6. The method of claim 5, wherein the ARP table entry comprises a time-to-live element indicative of a defined period of time that is based on the portion of network traffic being voice call data, and wherein the time-to-live element causes the third device to update the ARP table entry once the defined period of time has elapsed.

7. The method of claim 5, further comprising:
  receiving, by the third device, downstream network traffic addressed to the identifier of the user device; and
  sending, via the third device, based on the identifier of the second device, the downstream network traffic to the second device.

8. A method comprising:
  receiving, from a first device of a plurality of devices, an indication that a portion of network traffic at the first device comprises voice call data received from a user device via WiFi;
  associating, by a second device of the plurality of devices, with the user device; and
  sending, via the second device, based on:
    the indication that the portion of network traffic at the first device comprises voice call data received from the user device via WiFi, and
    the user device having associated with the second device,
  an address resolution protocol (ARP) message to each device of the plurality of devices, wherein the ARP message comprises a network mapping between an identifier of the user device and an identifier of the second device, and wherein the ARP message causes each device of the plurality of devices to update an entry of an ARP table to indicate the user device has associated with the second device.

9. The method of claim 8, further comprising:
  determining, by the first device, that the portion of network traffic comprises voice call data received from the user device via WiFi; and
  determining, by the first device, based on one or more of:
    a size of a packet associated with the portion of network traffic,
    a protocol type associated with the portion of network traffic,
    a frequency of receipt of packets associated with the protocol type, or
    a destination of the packet associated with the portion of network traffic,
  that the portion of network traffic comprises voice call data received from the user device via WiFi.

10. The method of claim 8, wherein the identifier of the second device comprises a media access controller (MAC) address.

11. The method of claim 8, wherein the identifier of the user device comprises an internet protocol (IP) address.

12. The method of claim 8, wherein a third device of the plurality of devices is a gateway device.

13. The method of claim 12, wherein the entry of the ARP table comprises a time-to-live element indicative of a defined period of time that is based on the portion of network traffic being voice call data, wherein the time-to-live element causes the third device to update the ARP table once the defined period of time has elapsed.

14. The method of claim 12, further comprising:
  receiving, by the third device, downstream network traffic addressed to the identifier of the user device; and
  sending, via the third device, based on the identifier of the second device, the downstream network traffic to the second device.

15. A method comprising:
  determining, by a user device, that a portion of network traffic at the user device comprises voice call data sent or received via WiFi;
  associating, by the user device, with a first device of a plurality of devices; and
  sending, via the user device to the first device, based on:
    the user device having associated with the first device, and
    the portion of network traffic at the user device comprising voice call data sent or received via WiFi,
  an address resolution protocol (ARP) message comprising a network mapping between an identifier of the user device and an identifier of the first device, wherein the first device causes each device of the plurality of devices, based on the ARP message, to update an ARP table entry to indicate the user device has associated with the first device.

16. The method of claim 15, further comprising:
  sending, via the first device, the ARP message to each device of the plurality of devices.

17. The method of claim 15, wherein determining that the portion of network traffic at the user device comprises voice call data sent or received via WiFi comprises:
  determining, by the user device, based on one or more of:
    a size of a packet associated with the portion of network traffic,
    a protocol type associated with the portion of network traffic,
    a frequency of receipt of packets associated with the protocol type, or
    a destination of the packet associated with the portion of network traffic,
  that the portion of network traffic at the user device comprises voice call data sent or received via WiFi.

18. The method of claim 15, wherein the identifier of the user device comprises one or more of a media access controller (MAC) address or an internet protocol (IP) address.

19. The method of claim 15, wherein a second device of the plurality of devices is a gateway device.

20. The method of claim 19, further comprising:
  receiving, by the second device, downstream network traffic addressed to the identifier of the user device; and
  sending, via the second device, based the identifier of the first device, the downstream network traffic to the first device.

* * * * *